(12) United States Patent
Reisinger

(10) Patent No.: US 12,135,144 B2
(45) Date of Patent: Nov. 5, 2024

(54) APPARATUS FOR HUMIDIFYING AIR IN AN AIR DUCT

(71) Applicant: Merlin Technology GmbH, Tumeltsham / Ried im Innkreis (AT)

(72) Inventor: Johann Reisinger, Pramet (AT)

(73) Assignee: Merlin Technology GmbH, Tumeltsham (AT)

( * ) Notice: Subject to any disclaimer, the term of this patent is extended or adjusted under 35 U.S.C. 154(b) by 0 days.

(21) Appl. No.: 15/519,899

(22) PCT Filed: Oct. 28, 2015

(86) PCT No.: PCT/AT2015/050270
§ 371 (c)(1),
(2) Date: Apr. 18, 2017

(87) PCT Pub. No.: WO2016/065384
PCT Pub. Date: May 6, 2016

(65) Prior Publication Data
US 2017/0248334 A1    Aug. 31, 2017

(30) Foreign Application Priority Data
Oct. 29, 2014   (AT) .................................. 50780/2014

(51) Int. Cl.
*F24F 6/14*     (2006.01)
*F24F 13/02*    (2006.01)
(Continued)

(52) U.S. Cl.
CPC ................ *F24F 6/14* (2013.01); *F24F 13/02* (2013.01); *F24F 13/08* (2013.01); *F24F 3/14* (2013.01);
(Continued)

(58) Field of Classification Search
CPC .... F24F 13/08; F24F 6/14; F24F 13/02; F24F 3/14; F24F 2006/146; F24F 6/12; Y02B 30/54
See application file for complete search history.

(56) References Cited

U.S. PATENT DOCUMENTS 2,208,443 A * 7/1940 Ashley ...................... F24F 3/14
                                                    62/99
2,235,005 A * 3/1941 Ashley ................... F24F 3/1411
                                                   236/44 C
(Continued)

FOREIGN PATENT DOCUMENTS

EP     0 251 196 A2    1/1988
EP     1 014 007 B1    6/2000
(Continued)

OTHER PUBLICATIONS

International Search Report of PCT/AT2015/050270, mailed Feb. 10, 2016.

*Primary Examiner* — Stephen Hobson

(57) ABSTRACT

An apparatus for humidifying air in an air duct
The invention relates to an apparatus for humidifying air in an air duct (1), comprising a feeding device for a liquid mist (10) and an air conducting device located upstream of the feeding device in the direction of flow (2). In order to provide advantageous humidifying conditions it is proposed that the air conducting device comprises at least one wing (7) which extends transversely to the direction of flow (2) and has an airfoil profile which is pitched against the direction of flow (2).

15 Claims, 2 Drawing Sheets

(51) Int. Cl.
*F24F 13/08* (2006.01)
*F24F 3/14* (2006.01)

(52) U.S. Cl.
CPC ......... *F24F 2006/146* (2013.01); *Y02B 30/54* (2013.01); *Y10S 261/15* (2013.01)

(56) References Cited

U.S. PATENT DOCUMENTS

| | | | | |
|---|---|---|---|---|
| 2,663,156 | A * | 12/1953 | Baker | F24F 3/14 62/155 |
| 3,353,800 | A * | 11/1967 | Wilmer | B01D 45/08 261/3 |
| 3,654,851 | A * | 4/1972 | Bertin | F24F 13/1486 454/319 |
| 3,908,528 | A * | 9/1975 | Bertin | F24F 13/08 49/74.1 |
| 4,572,428 | A * | 2/1986 | Groff | F24F 11/62 236/44 A |
| 4,913,856 | A * | 4/1990 | Morton | B01F 23/12 261/DIG. 15 |
| 4,980,099 | A | 12/1990 | Myers et al. | |
| 5,349,829 | A * | 9/1994 | Tsimerman | F24F 5/0035 261/153 |
| 5,380,088 | A * | 1/1995 | Fleischli | B01F 25/3131 366/337 |
| 5,516,466 | A * | 5/1996 | Schlesch | F24F 6/18 261/DIG. 76 |
| 5,653,919 | A * | 8/1997 | White | B01F 23/213 261/21 |
| 5,942,163 | A * | 8/1999 | Robinson | F24F 6/18 261/118 |
| 6,006,538 | A * | 12/1999 | Prueitt | F28C 3/08 62/331 |
| 6,059,866 | A * | 5/2000 | Yamagata | B01D 53/78 96/265 |
| 6,387,165 | B1 * | 5/2002 | Wakamatsu | B01D 47/06 96/322 |
| 6,488,219 | B1 * | 12/2002 | Herr | F24F 6/18 239/602 |
| 8,128,069 | B2 * | 3/2012 | Reens | F24F 6/12 261/78.2 |
| 8,973,906 | B2 * | 3/2015 | Klingenburg | F24F 3/14 261/95 |
| 2001/0032714 | A1 * | 10/2001 | Haglid | F24F 5/0035 62/271 |
| 2005/0056313 | A1 * | 3/2005 | Hagen | B01F 25/3132 137/3 |
| 2005/0212152 | A1 * | 9/2005 | Reens | F24F 6/12 261/118 |
| 2011/0147320 | A1 * | 6/2011 | Sealey | B01D 39/06 55/528 |
| 2014/0214340 | A1 * | 7/2014 | Pfatschbacher | G01N 27/82 702/38 |
| 2015/0121823 | A1 * | 5/2015 | Healey | B01D 39/1623 55/521 |
| 2017/0248334 | A1 * | 8/2017 | Reisinger | F24F 6/14 |
| 2018/0023824 | A1 * | 1/2018 | Reisinger | F24F 13/065 239/424.5 |
| 2022/0381455 | A1 * | 12/2022 | Guo | F24F 13/20 |

FOREIGN PATENT DOCUMENTS

| | | |
|---|---|---|
| SU | 1753198 A1 | 8/1992 |
| WO | 2003/001120 A1 | 1/2003 |

* cited by examiner

APPARATUS FOR HUMIDIFYING AIR IN AN AIR DUCT

CROSS REFERENCE TO RELATED APPLICATIONS

This application is the National Stage of PCT/AT2015/050270 filed on Oct. 28, 2015, which claims priority under 35 U.S.C. § 119 of Austrian Application No. A 50780/2014 filed on Oct. 29, 2014, the disclosure of which is incorporated by reference. The international application under PCT article 21(2) was not published in English.

FIELD OF THE INVENTION

The invention relates to an apparatus for humidifying air in an air duct, comprising a feeding device for a liquid mist and an air conducting device located upstream of said feeding device in the direction of flow (3).

DESCRIPTION OF THE PRIOR ART

In order to achieve the intake of the liquid mist in the air flow to the highest possible extent in apparatuses of this kind, it has already been proposed (WO 2003/001120 A1) to form the feeding device for the liquid mist from nozzles arranged in rows for misting the liquid and to provide upstream of the nozzles arranged in rows an air conducting device within the air duct which is made of turbulence winglets in form of rectangular triangles, whose shorter cathetus side is oriented in the direction of the nozzle row and whose longer cathetus side is oriented perpendicularly thereto. Said turbulence winglets are adjustably arranged in relation to the air flow in the air duct in such a way that air vortexes are produced with a swirl axis which is coaxial to the respective nozzle, so that the liquid droplets which are preferably injected into the air flow by the nozzles preferably formed as swirl nozzles are substantially entrained in a helical air flow, which increases the path of the droplets covered within the air duct, but does not lead to a substantial evaporation of the liquid without the likelihood of droplet deposition.

Similar conditions occur in an air washer for humidifying and tempering air in air-conditioning systems (EP 0 251 196 A2) when the individual nozzles of the air washer are surrounded by an air conducting device, by means of which a swirl is introduced into the air flow which flows past the nozzles. In order to prevent the discharge of liquid droplets by the humidifying air flow emerging from the air washer, it is necessary to use a droplet separator.

SUMMARY OF THE INVENTION

The invention is thus based on the object of providing an apparatus for humidifying air in an air duct in such a way that a substantial evaporation of the liquid mist introduced into the air flow can be expected, namely within a comparatively short longitudinal section of the air duct.

On the basis of an apparatus of the kind mentioned above, this object is achieved by the invention in such a way that the air conducting device comprises at least one wing which extends transversely to the direction of flow and has an airfoil profile which is pitched against the flow.

By providing at least one wing with an airfoil profile, the flow resistance caused by the air conducting device is kept at a low level on the one hand and vortex shedding which extends over the length of the wing is achieved on the other hand as a result of a respective pitching of the wing at the rear edge of the profile, so that the liquid mist introduced into the air flow is gripped by air vortexes whose swirl axis extends transversely to the direction of flow. The liquid droplets of the liquid mist which are entrained by said air vortexes are finely distributed as a result of the swirling in the air flow to be humidified and cover a multiple of the conveying distance predetermined by the air duct as a result of the swirl axes extending transversely to the air flow, with the effect that a substantial evaporation of all liquid droplets within a comparatively short longitudinal section of the air duct can be ensured. Deposition of the otherwise non-evaporated liquid droplets can thus be prevented and the efficiency of the humidification of the air can be improved substantially.

If the wing extends parallel to at least one row of outlet openings oriented transversely to the direction of flow for the liquid mist, the liquid mist is advantageously introduced in a distributed manner via the swirl axis of the air vortexes detaching from the wing along the rear profile edge of the airfoil profile, which supports a uniform distribution of the liquid mist over the swirling zone, especially when a respective distance perpendicular to the direction of flow and perpendicular to the row of the outlet openings is maintained for the vortex formation between the wing and the row of the outlet openings. The row of outlet openings can also be replaced by an outlet slot for the liquid mist, so that comparable conditions are obtained concerning the introduction of the liquid mist transversely to the direction of flow.

Although it may certainly be useful under certain preconditions to assign only one wing with an airfoil profile to a row of the outlet openings for the liquid mist, especially advantageous flow conditions are generally achieved when the row of the outlet openings is provided upstream with two wings arranged symmetrically with respect to the direction of flow. The liquid mist introduced into the air flow is gripped by the vortexes formed on both sides of the row of openings and detaching from the rear profile edge of the airfoil profiles, and is intimately mixed with the air to be humidified within said vortex flows, wherein the ejection range of the liquid mist depends on the arrangement of the airfoil profiles. If the upper sides of the airfoil profiles which produce an acceleration of the flow velocity face the row of the outlet openings, the air vortexes detaching from the airfoil profiles produce a concentration of the introduced liquid mist, whereas a greater spreading of the liquid mist is achieved in the case of an airfoil arrangement with the bottom side facing the row of the outlet openings.

If an inflow profile is provided upstream of the row of outlet openings or the outlet slot, especially advantageous flow conditions are achieved in the outlet region of the liquid mist, especially when a flow passage is produced by said inflow profile in conjunction with the respectively associated wing of the air conducting device.

As was already explained above, vortex formation depends on the one hand on the airfoil profile and on the pitch angle of the airfoil profile on the other hand. In order to enable an adjustment to the respectively given requirements, the pitch angle of the wing or wings can be adjustable. It is merely necessary to mount the wings in a pivotably adjustable manner for this purpose about an axis parallel to the longitudinal axis of the wing.

BRIEF DESCRIPTION OF THE DRAWINGS

The subject matter of the invention is shown by way of example in the drawings, wherein.

DESCRIPTION OF THE PREFERRED EMBODIMENT

Figure 1:
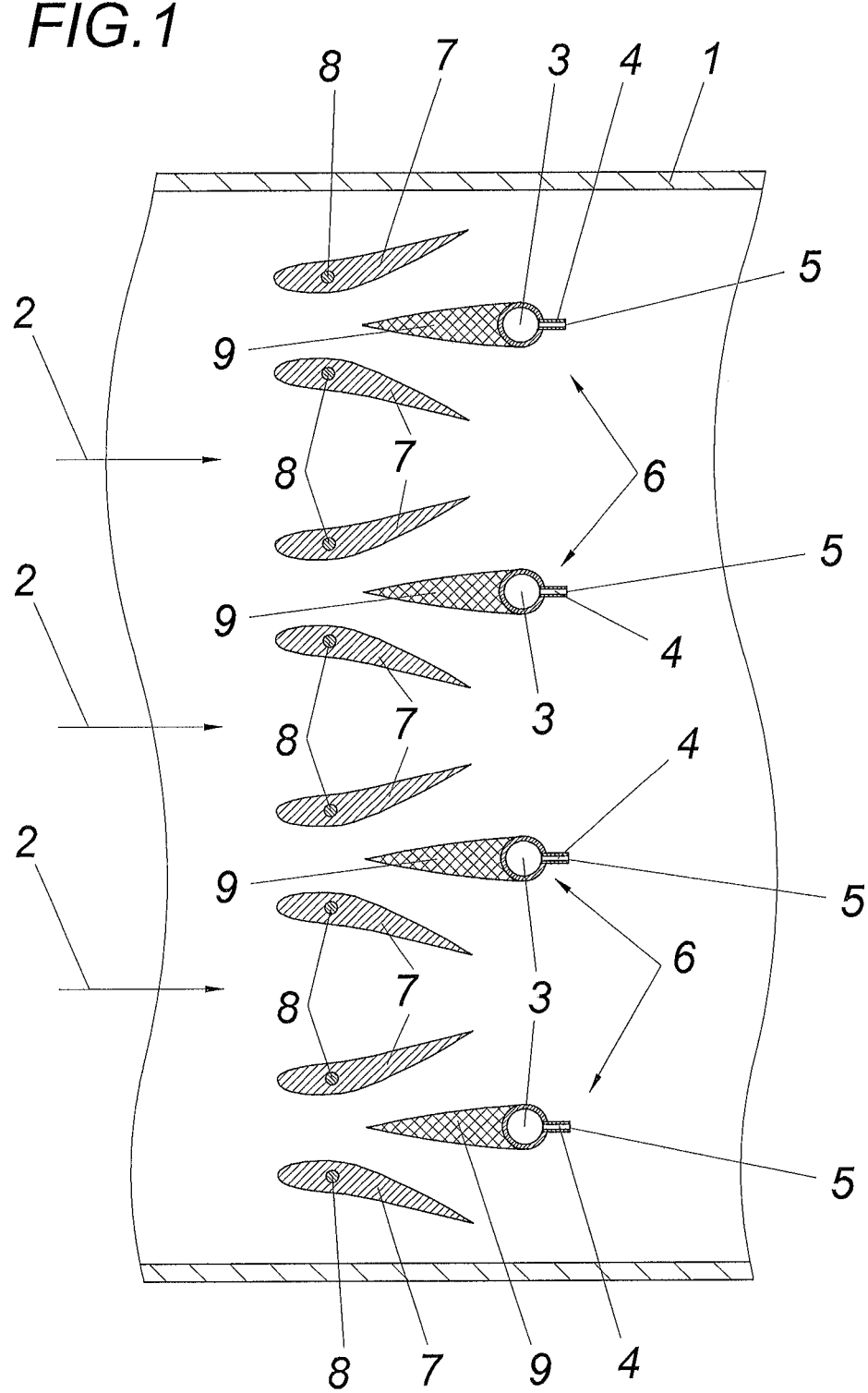
FIG. 1 shows an apparatus in accordance with the invention for humidifying air in a schematic longitudinal sectional view of the air duct perpendicularly to the axis of the rows of outlet openings.

In order to humidify the air conveyed through an air duct 1 of usually rectangular cross-section, a feeding device for a liquid mist with several parallel distributor tubes 3 extending transversely to the flow direction 2 for a liquid to be misted is provided according to FIG. 1, with which nozzles 4 are supplied, which nozzles are distributed over the length of the tube, oriented in the direction of flow 2 and introduce the respectively pressurised liquid in form of a mist into the air flow. The outlet openings 5 of said nozzles each form a row 6 extending transversely to the direction of flow 2, which are provided upstream with air conducting devices consisting of wings 7 with an airfoil profile, which wings extend parallel to the rows 6 of the outlet openings 5. Said wings 7 can be adjusted with respect to the pitch angle about pivoting axes 8 in relation to the direction of flow 2. The distributor tubes 3 are lined with an inflow profile 9 on the side facing the wings 7, wherein flow passages for the air flow are formed between the associated wings 7 in order to achieve advantageous flow conditions in the injection region of the liquid mist.

Figure 2:
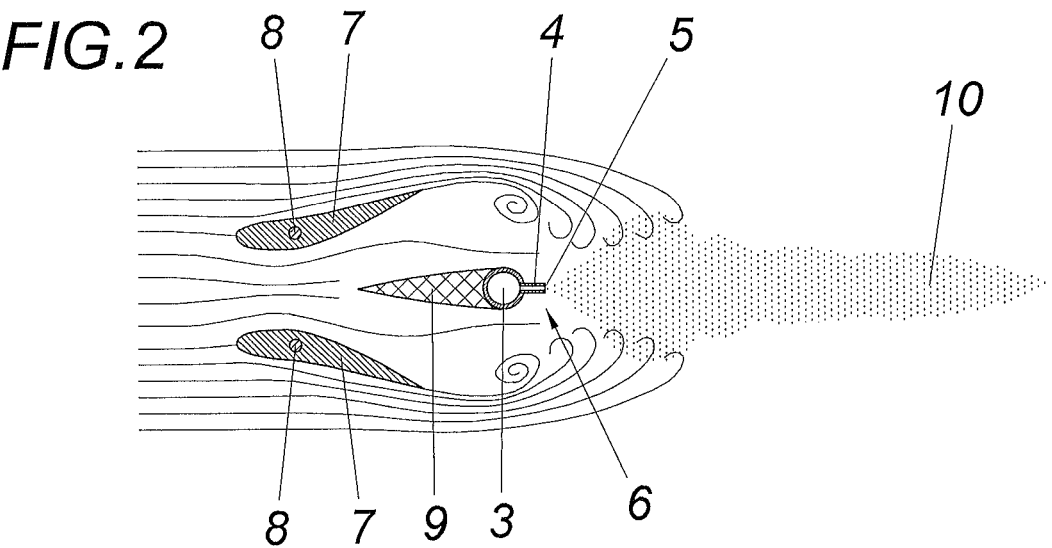
FIG. 2 shows a row of outlet openings with a guide device consisting of two wings with an airfoil profile in a sectional view perpendicularly to the row of the outlet openings on an enlarged scale, wherein the flow conditions are schematically indicated by the flow lines.

In FIG. 2, the flow conditions are schematically indicated by flow lines in the region of a row 6 of the outlet openings 5 for a liquid mist 10. As a result of the wing arrangement with an airfoil profile whose upper side producing an acceleration of the flow faces the nozzles 4 or the inflow profile 9, flow vortexes detach from the rear edge of the profile which produce a concentration of the injected liquid mist 10. It can be recognised that the vortex axes extend substantially parallel to the rear edge of the profile, i.e. transversely to the direction of flow 2, so that the liquid droplets gripped by said vortex layers are not only intimately mixed with the flow air, but also cover a distance within the air duct 1 as a result of the vortex movement about a vortex axis extending transversely to the direction of flow 2, which distance corresponds to a multiple of the respective longitudinal extension of the air duct 1. This means that within a comparatively short longitudinal section of the air duct 1 a distance can be provided as a result of the special vortex formation for the liquid droplets which is adequate for complete evaporation of the liquid droplets, since intimate mixing of the liquid droplets with the air is ensured by said vortex formation.

Figure 3:
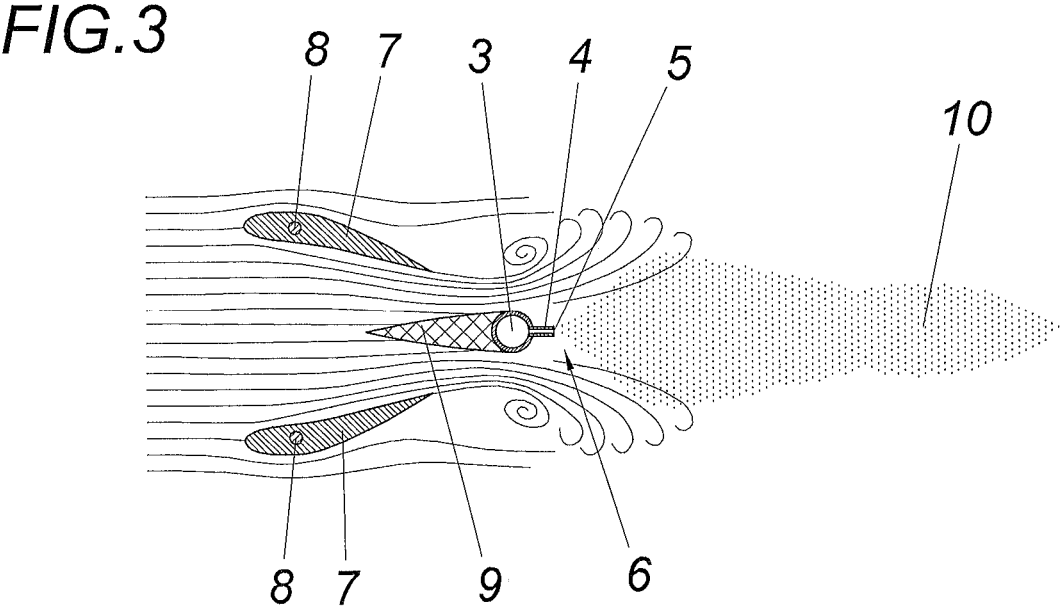
FIG. 3 shows a view of a constructional variant corresponding to FIG. 2 with an arrangement of the airfoil profiles which differs in comparison with FIG. 2.

According to the embodiment in accordance with FIG. 3, the wings 7 are oriented in comparison with FIG. 2 with the bottom side of the profile against the row of nozzles or the inflow profile 9, leading to vortex shedding on the profile side facing away from the row of the nozzles. The injected liquid mist 10 is therefore fanned out via the air vortexes, so that different requirements can be met by such a wing arrangement in comparison with the wing arrangement according to FIG. 2.

Figure 4:
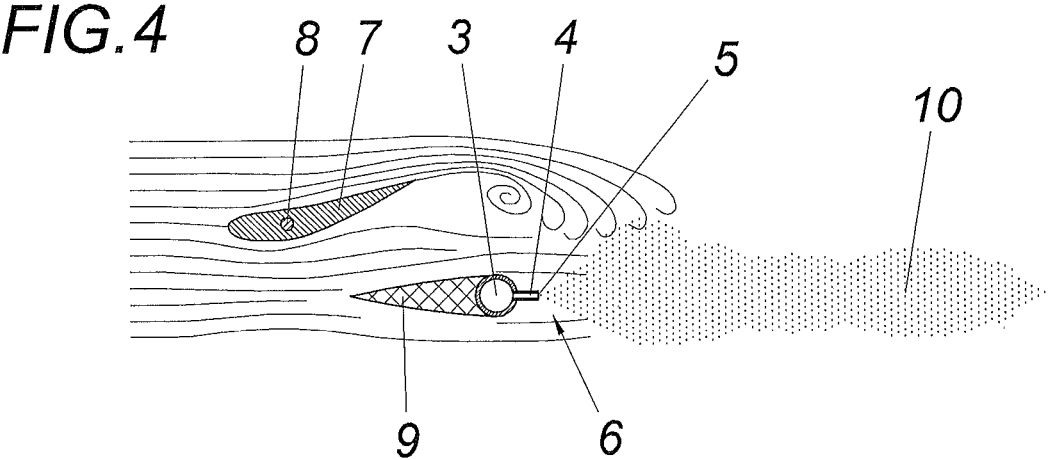
FIG. 4 shows an illustration of an air conducting device for a number of outlet openings with only one airfoil profile, which illustration corresponds to FIG. 2.

FIG. 4 shows that under specific preconditions a wing arrangement on one side can also be useful. Unsymmetrical conditions are achieved with the wings 7 provided on one side of the nozzle arrangement concerning the injection of the liquid mist 10 into the air flow, which can be advantageous in boundary regions of the air duct 1 for example.

Although it is principally possible to provide an air humidifying device in accordance with the invention with only one row of nozzles, especially advantageous construction conditions are provided by the arrangement of several rows of nozzles, not only concerning the distribution of the nozzles over the cross-section of the air duct 1, but also concerning the dosing of the injected liquid quantity. In order to achieve predetermined humidity content for the air flowing out of the air duct 1, a liquid quantity to be evaporated is required which is dependent on the humidity content of the air flowing into the air duct. The liquid quantity that is injectable via a row of nozzles depends under the given constructional conditions on the liquid pressure to which the individual nozzles 4 are subjected. If only a low liquid quantity is required for achieving a predetermined liquid content of the air emerging from the air duct 1, said liquid quantity can be introduced via a row of nozzles into the air duct, wherein the liquid quantity is dosed via the liquid pressure. If the liquid demand exceeds the liquid quantity that can be introduced under maximum application pressure via a row of nozzles, a further row of nozzles can be supplied with liquid, wherein it is commenced in the two rows of nozzles with minimal pressure required for adequate fine misting of the liquid in order to increase the liquid pressure for both rows of nozzles as required up to the maximum pressure before a further row of nozzles is activated at minimal pressure for covering an additional need for liquid for all rows of nozzles that are used.

Although according to the illustrated embodiment the liquid mist to be introduced into the air to be humidified is generated in a simple manner by misting the liquid by means of nozzles 4 which can be subjected to a respective pressure, the invention is in no way limited to such a generation of a liquid mist because it is merely necessary to introduce a liquid mist into the area to be humidified. The generation of the mist could also occur by an ultrasonic generator, wherein the feeding device must substantially comprise outlet openings through which the liquid mist is introduced into the air duct 1. The rows 6 of such outlet openings 5 can also be replaced by outlet slots.

The invention claimed is:

1. An air duct comprising an apparatus for humidifying air in the air duct, the apparatus comprising:
   at least one outlet opening or outlet slot in the air duct for generating a liquid mist, and
   at least one pair of wings located upstream of the at least one outlet opening or outlet slot in a flow direction of air wherein a flow passage for the air is formed between the two wings forming each pair of wings, with the at least one outlet opening or outlet slot positioned, viewed transversely to the flow direction of air, between the two wings forming each pair of wings, and the two wings of each pair of wings each have a surface that is essentially curved from a front edge of the wing to a rear edge of the wing, creating an airfoil profile which is pitched against the direction of flow of the air and produces an acceleration of a flow velocity of the air flow, wherein a pitching of the two wings of each pair of wings at a rear edge of the airfoil profile produces air vortexes for gripping liquid mist introduced into the air flow.

2. The air duct according to claim 1, further comprising at least one row of the outlet openings for the liquid mist, the at least one row being oriented transversely to the direction of flow,
wherein the two wings of each pair of wings extend parallel to the at least one row of outlet openings for the liquid mist, and
wherein the two wings of each pair of wings are arranged at a distance from the at least one row of the outlet openings, which distance is perpendicular in relation to the direction of flow and to the at least one row of the outlet openings.

3. The air duct according to claim 1, wherein the two wings of each pair of wings are arranged symmetrically with respect to the direction of flow.

4. The air duct according to claim 2, further comprising a distributor tube having a plurality of misting nozzles distributed over a length of the tube, wherein each of the misting nozzles has an outlet opening, together forming the at least one row of outlet openings, oriented in a direction of flow in the air duct, wherein the distributor tube has an inflow profile
provided upstream of the outlet openings.

5. The apparatus according to claim 1, wherein the at least one outlet slot is oriented transversely to the air duct and perpendicular to the direction of flow,
wherein the two wings of each pair of wings extend parallel to the at least one outlet slot for the liquid mist, and
wherein the two wings of each pair of wings are arranged at a distance from the at least one outlet slot.

6. The air duct according to claim 1, wherein a pitch angle of each of the two wings of each pair of wings is adjustable.

7. The air duct according to claim 1, wherein a surface of the airfoil profile is curved.

8. The air duct according to claim 1, wherein an upper surface of the airfoil profile of each of the two wings of each pair of wings faces the outlet opening or outlet slot to produce an acceleration of the air flow.

9. The air duct according to claim 1, wherein the at least one outlet opening is part of a nozzle for misting a liquid.

10. The air duct according to claim 1, wherein the essentially curved surface of each wing has a convex curvature.

11. The air duct according to claim 1, wherein the airfoil profile is asymmetric.

12. The air duct according to claim 1, wherein the two wings of each pair of wings diverge from one another.

13. The air duct according to claim 1, wherein the two wings of each pair of wings converge towards one another.

14. The air duct according to claim 1, wherein each of the two wings of each pair of wings has a non-uniform thickness from the front edge of the wing to the rear edge of the wing.

15. The air duct according to claim 1, wherein each of the two wings of each pair of wings has a chord line running inside a respective airfoil profile from the front edge of the wing to the rear edge of the wing.

* * * * *